United States Patent
Li et al.

(10) Patent No.: US 9,286,544 B2
(45) Date of Patent: Mar. 15, 2016

(54) METHODS AND APPARATUSES FOR FACILITATING OBJECT RECOGNITION

(75) Inventors: Jiangwei Li, Beijing (CN); Kongqiao Wang, Helsinki (FI); Lei Xu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 486 days.

(21) Appl. No.: 13/522,486

(22) PCT Filed: Jan. 29, 2010

(86) PCT No.: PCT/CN2010/070408
§ 371 (c)(1),
(2), (4) Date: Jul. 16, 2012

(87) PCT Pub. No.: WO2011/091593
PCT Pub. Date: Aug. 4, 2011

(65) Prior Publication Data
US 2012/0321176 A1 Dec. 20, 2012

(51) Int. Cl.
*G06K 9/62* (2006.01)

(52) U.S. Cl.
CPC ............ *G06K 9/6203* (2013.01); *G06K 9/6214* (2013.01); *G06K 9/6247* (2013.01)

(58) Field of Classification Search
CPC .................................................. G06K 9/6203
USPC ......... 382/209, 216–220, 222, 278, 295, 159, 382/156; 700/47–48; 706/15, 20
See application file for complete search history.

(56) References Cited

U.S. PATENT DOCUMENTS

| 5,164,992 A | 11/1992 | Turk et al. |
| 8,160,309 B1* | 4/2012 | Tzur et al. ...................... 382/118 |
| 8,280,828 B2* | 10/2012 | Perronnin et al. ............... 706/12 |
| 2002/0136448 A1* | 9/2002 | Bortolussi et al. ............ 382/164 |
| 2003/0059124 A1* | 3/2003 | Center, Jr. ..................... 382/278 |
| 2010/0296739 A1 | 11/2010 | Li et al. |

FOREIGN PATENT DOCUMENTS

| CN | 101017533 A | 8/2007 |
| CN | 101089874 A | 12/2007 |
| CN | 101142586 A | 3/2008 |
| WO | 2006/097902 A2 | 9/2006 |

OTHER PUBLICATIONS

Jin et al., "A new extension of kernel feature and its application for visual recognition", Neurocomputing 71, 2008, pp. 1850-1856.*
Turk et al., "Eigenfaces for Recognition", Journal of Cognitive Neuroscience, vol. 3, Issue 1, 1991, pp. 71-86.
(Continued)

*Primary Examiner* — Samir Ahmed
(74) *Attorney, Agent, or Firm* — Alston & Bird LLP

(57) ABSTRACT

Methods and apparatuses are provided for facilitating object recognition. A method may include accessing data for a first object and data for a second object. The method may additionally include comparing the first and second objects based at least in part upon a reference set and training results generated based at least in part upon the reference set and training data. The method may further include determining whether the first object and the second object are the same object based at least in part upon the comparison. Corresponding apparatuses are also provided.

18 Claims, 7 Drawing Sheets

(56) References Cited

OTHER PUBLICATIONS

Belhumeur et al., "Eigenfaces vs Fisherfaces: Recognition using Class Specific Linear Projection", IEEE Transactions on Pattern Analysis and Machine Intelligence, vol. 19, Issue 7, Jul. 1997, pp. 711-720.

Savvides et al., "Class Dependent Kernel Discrete Cosine Transform Features for Enhanced Holistic Face Recognition in FRGC-II", IEEE Proceedings of International Conference on Acoustics, Speech and Signal Processing, vol. 2, 2006, pp. 185-188.

Ahonen et al., "Face Recognition with Local Binary Patterns", European Conference on Computer Vision, Lecture Notes in Computer Science, vol. 3021, 2004, pp. 469-481.

Liu et al., "Gabor Feature Based Classification Using the Enhanced Fisher Linear Discriminant Model for Face Recognition", IEEE Transactions on Image Processing, vol. 11, Issue 4, Apr. 2002, pp. 1-36.

Heisele et al., "Face Recognition with Support Vector Machines: Global versus Component-based Approach", Proceedings of Eighth IEEE International Conference on Computer Vision, vol. 2, 2001, 7 pages.

Zhang et al., "Face Recognition with Local Steerable Phase Feature", Pattern Recognition Letters, vol. 27, Issue 16, Dec. 2006, pp. 1927-1933.

Wang et al., "Random Sampling for Subspace Face Recognition", International Journal of Computer Vision, vol. 70, Issue 1, Oct. 2006, pp. 91-104.

Kim et at., "Face Recognition using LDA Mixture Model", Pattern Recognition Letters, vol. 24, Issue 15, Nov. 2003, pp. 2815-2821.

Liu et al., "Occlusion Robust Face Recognition with Dynamic Similarity Features", 18th International Conference on Pattern Recognition, vol. 3, 2006, pp. 544-547.

Jarudi et al., "Relative Contributions of Internal and External Features to Face Recognition", Technical report, MIT Artificial Intelligence Laboratory, CBCL-225, Mar. 2003, 12 pages.

International Search Report and Written Opinion received for corresponding International Patent Application No. PCT/CN2010/070408, dated Nov. 11, 2010, 10 pages.

Office Action for Chinese Application No. 201080062665.5 dated Jan. 16, 2015.

Office action received for corresponding Korean Patent Application No. 2012-7022503, dated Aug. 21, 2014, 3 pages of Office Action, No English Language Translation available.

Liu et al., "Feature Extraction of HRRP Based on LDA Algorithm"; *Journal of National University of Defense Technology*, vol. 27, No. 6; 2005; 6 pages.

Office Action from corresponding Chinese Patent Application No. 201080062665.5, dated Jul. 31, 2015.

\* cited by examiner

METHODS AND APPARATUSES FOR FACILITATING OBJECT RECOGNITION

RELATED APPLICATION

This application was originally filed as PCT Application No. PCT/CN2010/070408 filed Jan. 29, 2010.

TECHNOLOGICAL FIELD

Embodiments of the present invention relate generally to object recognition technology and, more particularly, relate to methods and apparatuses for facilitating object recognition.

BACKGROUND

Face detection, face recognition, and facial tracking are finding an increasing number of uses and applications. The increase in potential applications for facial analyses has partly occurred as a result of the continuously increasing speed and capabilities of modern microprocessors. As a result, facial analysis can be used in a number of settings for various applications including biometrics, user interface applications, gaming application, social networking and other interpersonal commutations applications. The advancement in computing power of microprocessors has also made facial analysis functionality available on mobile devices, such as cell phones and other smart devices. Facial analysis may also be important going forward in relation to initiatives such as metadata standardization.

Although facial analysis techniques continue to improve, many current methods require either a high computation capability or suffer from limited face detection performance. Complicating issues, such as, faces not being oriented directly towards the camera or natural changes to the faces (e.g., eyes closed) can negatively impact the results of facial analyses. As applications for facial detection, recognition, and tracking are developed, these and other challenges should be overcome to provide further improvements in the area of facial analysis.

BRIEF SUMMARY OF SOME EXAMPLES OF THE INVENTION

Methods, apparatuses, and computer program products are herein provided for facilitating object recognition. In this regard, methods, apparatuses, and computer program products are provided that may provide several advantages to computing devices and computing device users. Embodiments of the invention provide for object recognition using a reference set. An example embodiment of the invention provides for enhanced object recognition by using the reference set both for training and for recognizing objects, which is also referred to as "testing." In this regard, discriminative information used for testing is derived in accordance with an example embodiment of the invention from both training data, and the reference set. Accordingly, embodiments of the invention use a reference set as an independent data collection so as to reduce the reliance of object recognition on training data. In an example embodiment, object recognition (e.g., testing) is performed using both training results and the reference set. Accordingly, embodiments of the invention utilize the reference set as a reference for all data (e.g., training data and testing data) in a given space. In this regard, the reference set provides a third data set in addition to a training set and testing set in an example embodiment of the invention. Embodiments of the invention further provide for coding data with reference features derived using the reference set and balancing the importance of reference sets through supervised learning. Accordingly, embodiments of the invention may provide for enhanced object recognition. Some embodiments are particularly applicable to face recognition.

In a first example embodiment, a method is provided, which comprises accessing data for a first object and data for a second object. The method of this embodiment further comprises comparing the first and second objects based at least in part upon a reference set and training results generated based at least in part upon the reference set and training data. The method of this embodiment additionally comprises determining whether the first object and the second object are the same object based at least in part upon the comparison.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least access data for a first object and data for a second object. The at least one memory and stored computer program code are configured to, with the at least one processor, further cause the apparatus of this embodiment to compare the first and second objects based at least in part upon a reference set and training results generated based at least in part upon the reference set and training data. The at least one memory and stored computer program code are configured to, with the at least one processor, additionally cause the apparatus of this embodiment to determine whether the first object and the second object are the same object based at least in part upon the comparison.

In another example embodiment, a computer program product is provided. The computer program product of this embodiment includes at least one computer-readable storage medium having computer-readable program instructions stored therein. The program instructions of this embodiment comprise program instructions configured to access data for a first object and data for a second object. The program instructions of this embodiment further comprise program instructions configured to compare the first and second objects based at least in part upon a reference set and training results generated based at least in part upon the reference set and training data. The program instructions of this embodiment additionally comprise program instructions configured to determine whether the first object and the second object are the same object based at least in part upon the comparison.

In another example embodiment, an apparatus is provided that comprises means for accessing data for a first object and data for a second object. The apparatus of this embodiment further comprises means for comparing the first and second objects based at least in part upon a reference set and training results generated based at least in part upon the reference set and training data. The apparatus of this embodiment additionally comprises means for determining whether the first object and the second object are the same object based at least in part upon the comparison.

In another exemplary embodiment, a computer-readable storage medium carrying computer-readable program instructions is provided. The computer-readable program instructions of this embodiment comprise program instructions configured to access data for a first object and data for a second object. The computer-readable program instructions of this embodiment further comprise program instructions configured to compare the first and second objects based at least in part upon a reference set and training results generated based at least in part upon the reference set and training data.

The computer-readable program instructions of this embodiment additionally comprise program instructions configured to determine whether the first object and the second object are the same object based at least in part upon the comparison.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
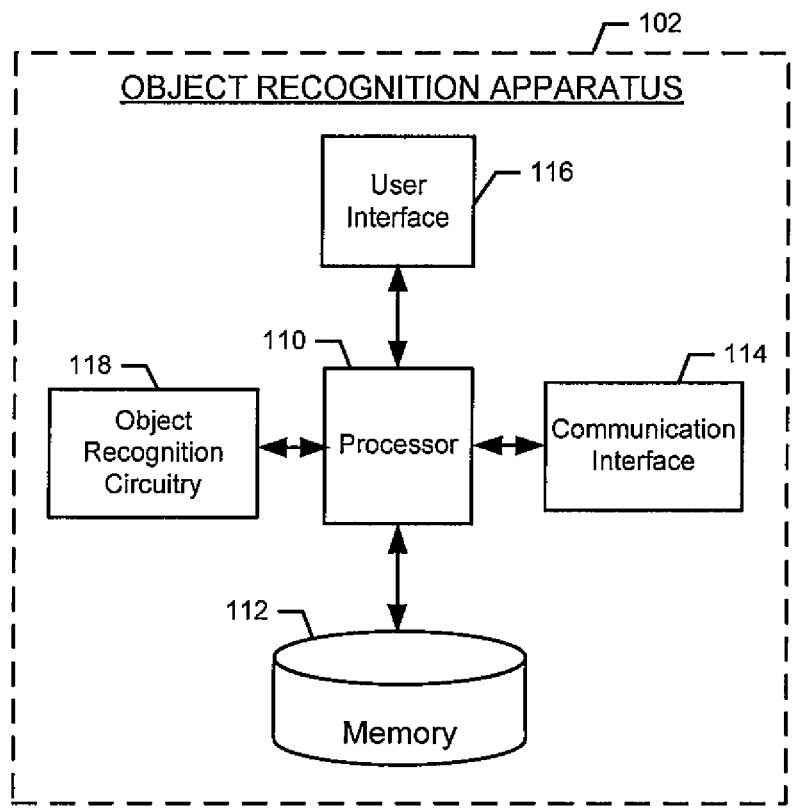
FIG. 1 illustrates a block diagram of an object recognition apparatus for facilitating object recognition according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Existing face recognition algorithms generally consist of two stages: (1) data training and (2) data testing. Data training is used to learn prior discriminative information from training data so that the learned knowledge can be generalized to testing data. In data testing, the features of testing data are extracted based on training results. In this regard, a data testing stage may be used to determine whether faces are classified into the same class.

In these existing face recognition algorithms, the testing performance is entirely dependant on the training process of the data training stage. If the training results are not reliable, the recognition performance in a testing stage will drop dramatically. Testing performance cannot always be guaranteed because it is difficult to ensure the reliability of the training.

Embodiments of the invention provide for enhanced object recognition by introducing a reference set constituting a third data collection into the object recognition process. As will be described further, embodiments of the invention use the reference set for both training and testing (e.g., object recognition). This reference set based object recognition may overcome training process deficiencies that might otherwise impact recognition performance. Example embodiments of the invention are illustrated in the figures and described in further detail below. It will be appreciated that the example embodiments illustrated and described are provided for purposes of example and should not be construed to narrow the scope or spirit of the invention in any way. In this regard, the scope of the invention encompasses many potential embodiments in addition to those illustrated and described herein. Some of the example embodiments described herein are described with respect to face object recognition (e.g., face recognition). Face object recognition is provided for purposes of example of one type of object recognition to which embodiments of the invention may be beneficially applied. It will be appreciated that whenever an embodiment is described with respect to face object recognition, the embodiment may be similarly applied to recognition of any other type or class of object.

FIG. 1 illustrates a block diagram of an object recognition apparatus 102 for facilitating object recognition according to an example embodiment of the invention. It will be appreciated that the object recognition apparatus 102 is provided as an example of one embodiment of the invention and should not be construed to narrow the scope or spirit of the invention in any way. In this regard, the scope of the invention encompasses many potential embodiments in addition to those illustrated and described herein. As such, while FIG. 1 illustrates one example of a configuration of an object recognition apparatus for facilitating object recognition, numerous other configurations may also be used to implement embodiments of the present invention.

The object recognition apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the object recognition apparatus 102 is embodied as a mobile terminal, such as that illustrated in FIG. 2.

Figure 2:
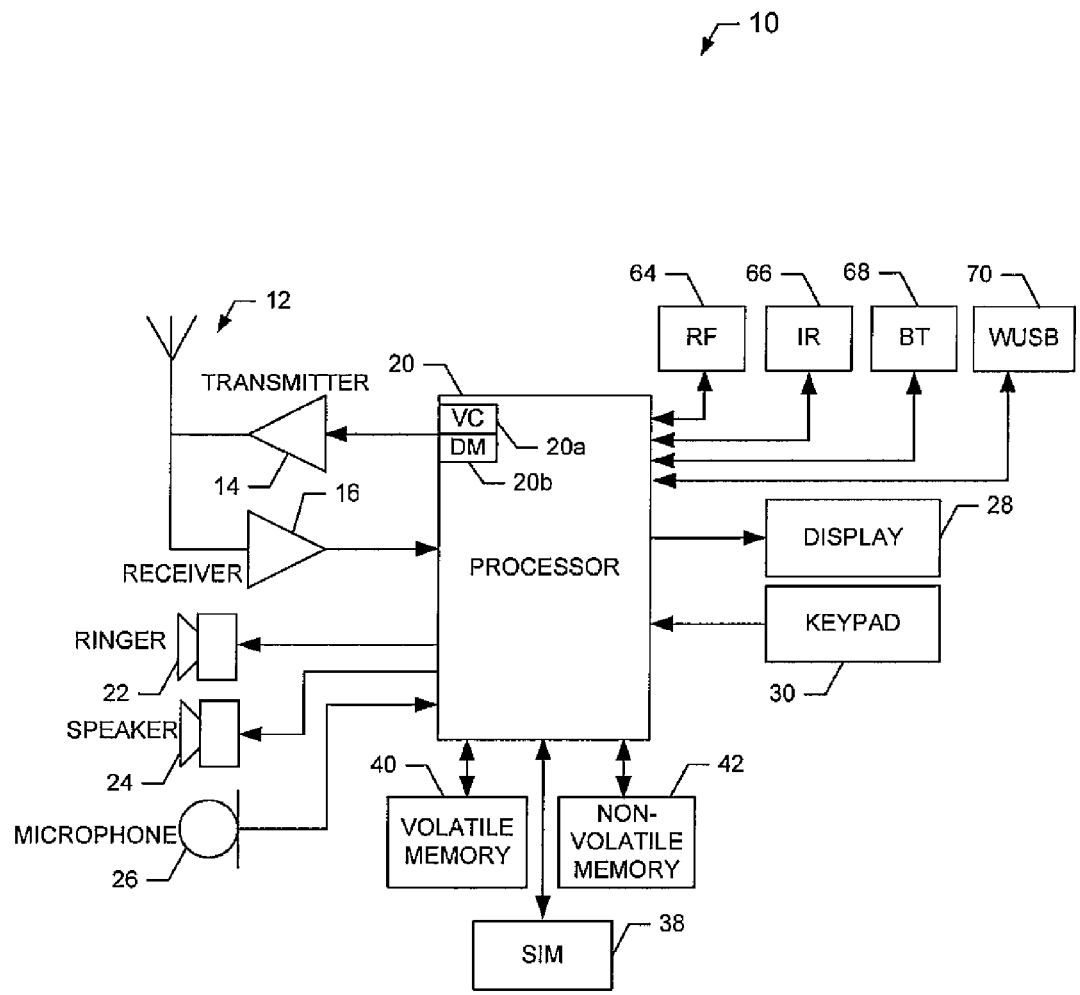
FIG. 2 is a schematic block diagram of a mobile terminal according to an example embodiment of the present invention.

In this regard, FIG. 2 illustrates a block diagram of a mobile terminal 10 representative of one embodiment of an object recognition apparatus 102 in accordance with embodiments of the present invention. It should be understood, however, that the mobile terminal 10 illustrated and hereinafter described is merely illustrative of one type of object recognition apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GARS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the object recognition apparatus 102 includes various means, such as a processor 110, memory 112, communication interface 114, user interface 116, and object recognition circuitry 118 for performing the various functions herein described. These means of the object recognition apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the object recognition apparatus 102 as described herein. The plurality of processors may be embodied on a single computing device or distributed across a plurality of computing devices collectively configured to function as the object recognition apparatus 102. In embodiments wherein the object recognition apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the object recognition apparatus 102 to perform one or more of the functionalities of the object recognition apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the object recognition apparatus 102. In various embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the object recognition apparatus 102 is embodied as a mobile terminal 10, the memory 112 may comprise the volatile memory 40 and/or the non-volatile memory 42. The memory 112 may be configured to store information, data, applications, instructions, or the like for enabling the object recognition apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, data representative of an object, a set of reference objects, training data, testing data, data indicating object recognition results, other data, and/or the like. This stored information may be stored and/or used by object recognition circuitry 118 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to an entity. For example, the communication interface 114 may be configured to communicate with a remote computing device over a network to facilitate receipt or transmission of data representative of an object, a set of reference objects, training data, testing data, data indicating object recognition results, other data, and/or the like. In at least one embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the object recognition apparatus 102 and one or more remote computing devices are in communication. The communication interface 114 may additionally be in communication with the memory 112, user interface 116, and/or object recognition circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the object recognition apparatus 102 is embodied as one or more servers, aspects of the user interface 116 may be reduced or the user interface 116 may even be eliminated. The user interface 116 may be in communication with the memory 112, communication interface 114, and/or object recognition circuitry 118, such as via a bus.

The object recognition circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the object recognition circuitry 118 is embodied separately from the processor 110, the object recognition circuitry 118 may be in communication with the processor 110. The object recognition circuitry 118 may further be in communication with one or more of the memory 112, communication interface 114, or user interface 116, such as via a bus.

In order to facilitate a better understanding of reference set based object recognition, the concepts of reference sets, reference objects, and reference features will now be described in the context of several examples. It will be appreciated that these examples are provided by way of example for conceptual understanding and are not intended to be limiting with respect to how reference sets, reference objects, and/or reference features are mathematically and/or physically defined.

Figure 3:
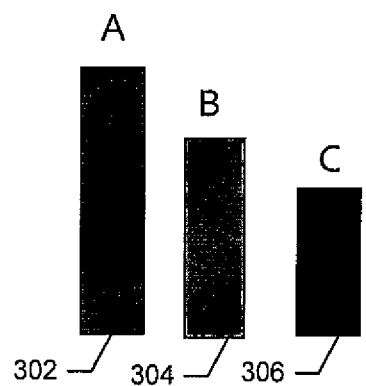
FIG. 3 illustrates a generalized example of a reference object.

FIG. 3 illustrates a generalized example of a reference object. In this regard, column B 304 is defined as a reference object. Based on this reference object, qualities of column A 302 and column C 306 may be determined. In this regard, for example, compared to column B 304, column A 302 is tall and column C 306 is short. Accordingly, by using column B 304 as a reference object, a data feature about the height of column A 302 and column C 306 may be obtained. A reference set may accordingly comprise a set or collection of reference objects by which a comparison between any data and any reference object may be performed to retrieve reference features.

Figure 4:
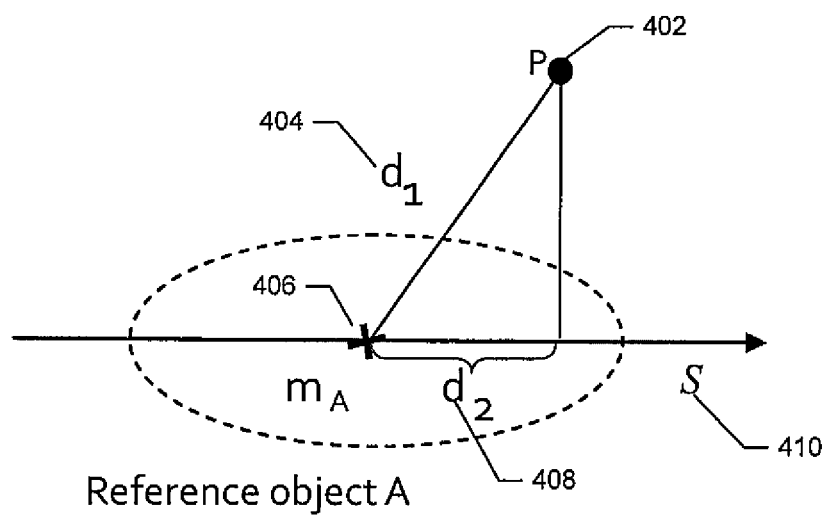
FIGS. 4-6 illustrate reference objects, reference sets, and reference features according to example embodiments of the invention.
Figure 5:
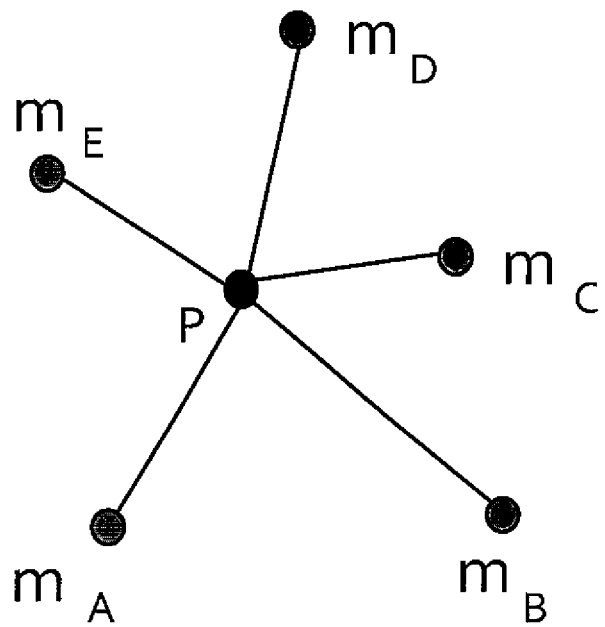
Figure 6:
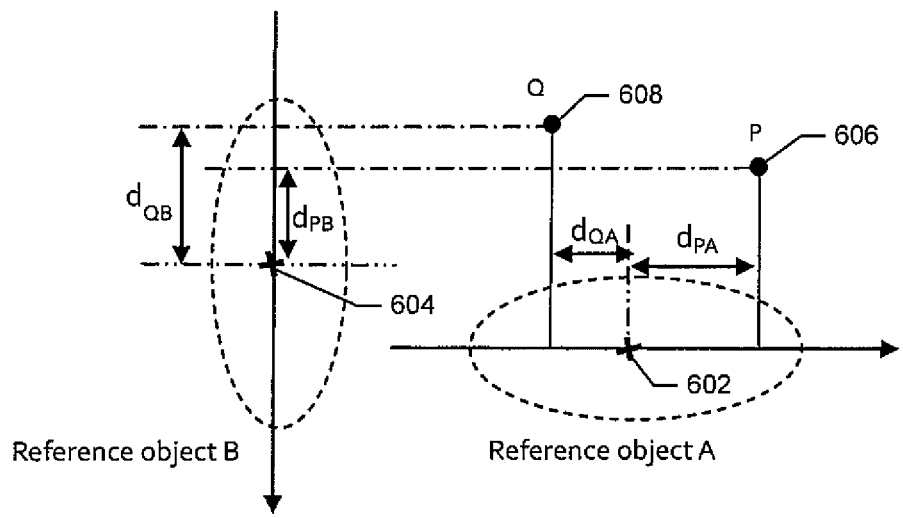

FIGS. 4-6 illustrate reference objects, reference sets, and reference features according to example embodiments of the invention. In an example embodiment, a reference set used to facilitate object (e.g., face object) recognition comprises statistical quantities extracted from reference object (e.g., face) classes, which does not convolve in both training and testing. Given the reference object A illustrated in FIG. 4, a reference set may comprise the mean of A (e.g., $m_A$ 406), the eigenvector of A (e.g., S 410), higher order statistical quantities of A, or the like. If the reference set comprises means of classes, the distance between the point P 402 and $m_A$ 406, $d_1$ 404, may be defined as the reference feature of P 402. If the reference set comprises S 410, the projection distance between P 402 and S 410, $d_2$ 408 may be defined as the reference feature of P 402.

The underlying geometrical explanation of various reference features may be different. As illustrated in FIG. 5, given a set of class means $m_A$~$m_E$ as a reference set, the reference feature of distances from P to the respective class means may indicate the data location in high dimensional space. Referring now to FIG. 6, FIG. 6 illustrates two manifolds (manifolds 602 and 604) learned from face objects as a reference set. The distances from P 606 to the manifolds 602 and 604 may be defined as $d_{PA}$ and $d_{PB}$, respectively. Similarly, the distances from Q 608 to the manifolds 602 and 604 may be defined as $d_{QA}$ and $d_{QB}$, respectively. As illustrated in FIG. 6, the difference between $d_{PB}$ and $d_{QB}$ is much smaller than that of $d_{PA}$ and $d_{QA}$. This disparity in difference indicates that the distribution of A is more similar to the joint distribution supported by P and Q, which provides discriminative information for face recognition.

In order to facilitate reference set based object recognition, the object recognition circuitry 118 is configured in some embodiments to generate a reference set. In this regard, the object recognition circuitry 118 may be configured to generate a reference set from a set of reference objects, such as by statistical learning. A reference set generated by the object recognition circuitry 118 may comprise class means of a plurality of reference objects (e.g., face objects).

In an example embodiment, the object recognition circuitry 118 is configured to generate a reference set comprising a plurality of manifolds determined based at least in part upon reference objects. In this regard manifolds comprising a reference set may encode data distribution information beneficial to object recognition. Generation of a reference set comprising manifolds may be performed as follows.

Assume a reference face object $R_i = \{R_i^1, R_i^2, \ldots, R_i^{t_i}\}$, $i \leq W$, where W is the number of reference objects and $t_i$ is the image number in $R_i$. The object recognition circuitry 118 may be configured to compute the mean $m_i$ of the reference face object as:

$$m_i = \sum_{g=1}^{t_i} \frac{R_i^g}{t_i} \tag{1}$$

The object recognition circuitry 118 may be further configured to centralize the data in $R_i$ at the mean $m_i$ to obtain the normalized set $\overline{R_i} = \{\overline{R_i^1}, \overline{R_i^2}, \ldots \overline{R_i^{l_i}}\}$, where $$\overline{R_i^s} = R_i^s - m_i \quad (2)$$

In order to determine the underlying data distribution of $R_i$, the object recognition circuitry 118 may be configured to calculate the manifold $s_i$ that use minimal number of eigenvectors to best represents $R_i$ by Single Value Decomposition (SVD) on the covariance matrix of $R_i$:

$$S_i = \text{SVD}(\overline{R_i} * \overline{R_i}^T) \quad (3),$$

where $\overline{R_i}^T$ is the transformation matrix of $\overline{R_i}$.

For a different reference object $R_i$, the object recognition circuitry 118 may be configured to additionally determine a corresponding reference manifold $s_i$. The determined reference manifolds may form the reference set generated by the object recognition circuitry 118. To support recognition of face objects, a large scale of reference manifolds may be needed due to large diversities in data distribution of faces. Each manifold may represent a specific data distribution in high dimensional face space. If there are W reference objects $R = \{R_1, R_2, \ldots, R_W\}$, their reference means and reference manifolds may be denoted as $M = \{m_1, m_2, \ldots, m_W\}$ and $S = \{S_1, S_2, \ldots, S_W\}$.

The object recognition circuitry 118 is configured in an example embodiment to extract reference feature from testing data and/or from training data based at least in part on the reference set. In this regard, the object recognition circuitry 118 may be configured to extract reference feature data (e.g., image data, testing data, training data, and/or the like) by mapping at least a portion of the data onto a reference manifold in the reference set to obtain a projection value. The extracted reference value may comprise the obtained projection value.

Extraction of a reference value may be performed in accordance with the following example. For purposes of this example, assume there are G face classes in the training set. Each class may be denoted as $Tr_j = \{Tr_{j1}, Tr_{j2}, \ldots, Tr_{ji}, \ldots | j \leq G\}$. For reference mean $m_a$ and reference manifold $S_a$, given a training data $Tr_{ji}$, the reference feature $P_{ji}^a$ may be represented as:

$$P_{ji}^a = S_a^T \cdot (Tr_{ji} - m_a) \quad (4),$$

where $S_a^T$ is the transformation matrix of $S_a$. As there are W reference objects in this example, after applying the same projection operation on $Tr_{ji}$, the object recognition circuitry 118 may generate a reference feature vector $P_{ji} = \{P_{ji}^1, P_{ji}^2, \ldots, P_{ji}^W\}$. As such, each training class may be represented as $P_j = \{P_{j1}, P_{j2}, \ldots, P_{ji}, \ldots | j \leq G\}$ with reference features. The same operation may be applied by the object recognition circuitry 118 to testing data to retrieve reference testing features as well.

In some embodiments the object recognition circuitry 118 is configured to analyze the relative importance of reference manifolds extracted from training data. If, for example, a reference manifold is more representative on coding face object intra-class distribution, the object recognition circuitry 118 may attach the reference manifold with a greater weight. Accordingly, reference features may be combined by the object recognition circuitry 118 according to their relative discriminative capabilities.

As described above, the reference features $P_j = \{P_{j1}, P_{j2}, \ldots, P_{ji}, \ldots | j \leq G\}$ may be extracted from training data $Tr_j = \{Tr_{j1}, Tr_{j2}, \ldots, Tr_{ji}, \ldots | j \leq G\}$. The object recognition circuitry 118 may be configured to use a supervised learning technique to determine (e.g., learn) a discriminative subspace $D = \{D_1, D_2, \ldots, D_H\}$ from $P_j$, where H is the number of eigenvectors learned by the supervised learning technique. In an example embodiment, the supervised learning technique comprises linear discriminant analysis (LDA). In this regard, the training results (e.g., learning results) of a training process may comprise the determined discriminative subspace. The discriminative subspace may provide an elegant mechanism for the object recognition circuitry 118 to linearly fuse all of a subset of reference features based on discriminative optimization criterion. Accordingly, reference features with high discriminative capability may be attached with larger weights so as to enhance recognition performance.

The object recognition circuitry 118 is configured in an example embodiment to perform object recognition. In this regard, the object recognition circuitry 118 may be configured to consider data for a first object (e.g., a first face object) and data for a second object (e.g., a second face object) and determine whether the first object and the second object are the same object. The object recognition circuitry 118 may be configured to determine whether a first object and second object are the same object based at least in part upon a comparison of the first and second objects made based at least in part upon a reference set and training results generated based at least in part upon the reference set and training data. In this regard, the object recognition circuitry 118 may be configured to perform reference set based object recognition.

As such, the object recognition circuitry 118 may be configured when testing, similar to training, to recognize data (e.g., data for an object) based at least in part on the reference set. For example, given any two face objects X and Y, the object recognition circuitry 118 may compute the reference features $P_X^a$ and $P_Y^a$ on each reference mean $m_a$ and reference manifold $S_a$ in accordance with equation (4). The object recognition circuitry 118 may further map the reference features $P_X^a$ and $P_Y^a$ onto the subspace D to obtain the merged features $F_X$ and $F_Y$. In this regard, the training results may be merged into feature generation in a testing phase.

The object recognition circuitry 118 may be further configured to determine a distance between the merged features $F_X$ and $F_Y$. In determining distance, the object recognition circuitry 118 may be configured to use a Euclidean distance metric. However, it will be appreciated that Euclidean distance is provided only for purposes of example of one distance metric that may be used. In this regard, any appropriate distance metric may be used in addition to or in lieu of Euclidean distance, such as, Manhattan distance metric, Chebyshev distance metric, and/or the like. The object recognition circuitry 118 may determine whether X and Y are sampled from the same person (e.g., whether X and Y are the same object) based at least in part upon the determined distance. For example, in one embodiment, the object recognition circuitry 118 may be configured to determine that two objects (e.g., X and Y) are the same object when the determined distance is less than a predetermined threshold.

Figure 7:
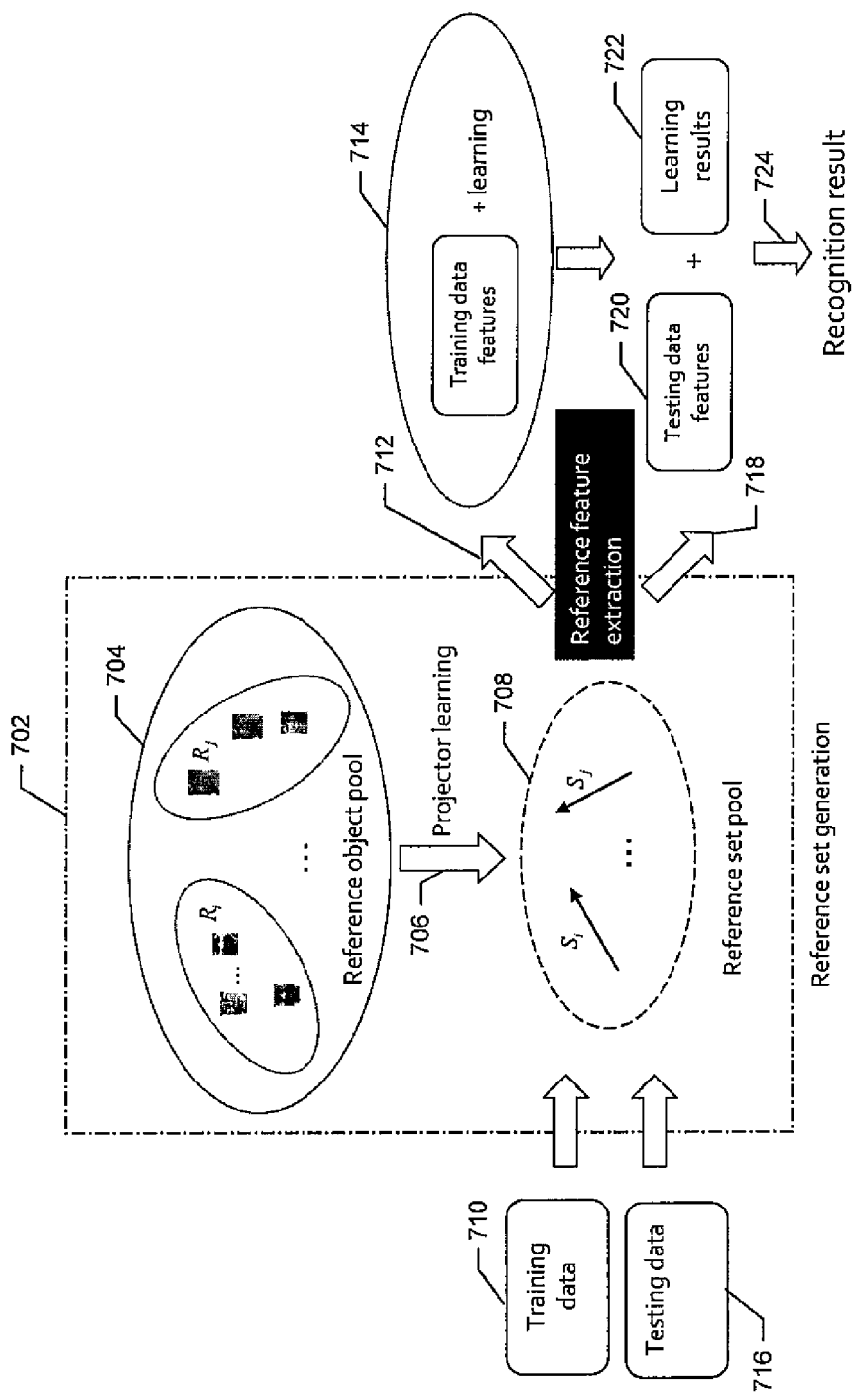
FIG. 7 illustrates a process for facilitating object recognition according to an example embodiment of the invention.

FIG. 7 illustrates a process for facilitating object recognition according to an example embodiment of the invention. The object recognition circuitry 118 may be configured to generate a reference set, at operation 702. In this regard, the object recognition circuitry 118 may be configured to determine a plurality of manifolds from a pool of reference objects 704, at operation 706. The determined manifolds may comprise a reference set pool 708.

Given training data 710, the object recognition circuitry 118 may extract one or more reference features from the training data 710, at operation 712. The one or more reference features extracted from the training data are labeled "training data features" in FIG. 7. The object recognition circuitry 118 may be further configured to perform learning based on the training data figures, at operation 714 to generate the learning results 722. The learning results may, for example, comprise a discriminative subspace determined from the training data features.

Given testing data 716, the object recognition circuitry 118 may extract one or more reference features from the testing data 716, at operation 718. The object recognition circuitry 118 may utilize the extracted testing data features 720 and learning results 722 to determine an object recognition result for the testing data, at operation 724. In this regard, the object recognition circuitry 118 may, for example, determine whether a first object and a second object are the same object. The first and second objects may, for example, comprise face objects and the object recognition circuitry 118 may determine whether the first and second face objects are sampled from the same person.

Figure 8:
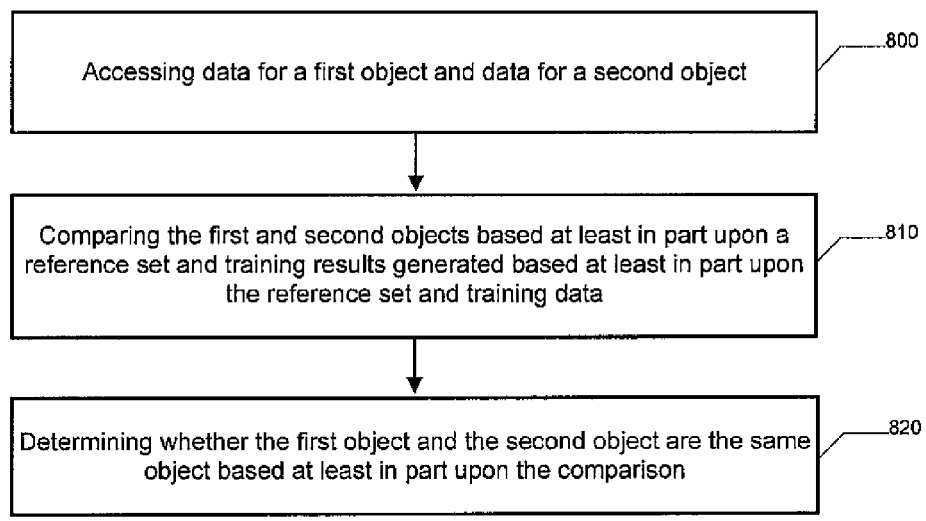
FIG. 8 illustrates a flowchart according to an example method for facilitating object recognition according to an example embodiment of the invention.

FIG. 8 illustrates a flowchart according to an example method for facilitating object recognition according to an example embodiment of the invention. The operations illustrated in and described with respect to FIG. 8 may, for example, be performed by and/or under the control of the object recognition circuitry 118. Operation 800 may comprise accessing data for a first object and data for a second object. The data for a respective object may, for example, comprise data representative of the object or a portion thereof. In this regard, the data for a respective object may, for example, comprise image data representative of an image of the object or a portion thereof. The first and second objects may, for example, comprise face objects. Operation 810 may comprise comparing the first and second objects based at least in part upon a reference set and training results generated based at least in part upon the reference set and training data. Operation 820 may comprise determining whether the first object and the second object are the same object based at least in part upon the comparison. When the first and second objects comprise face objects, operation 820 may comprise determining whether the first and second objects are sampled from the same person.

Figure 9:
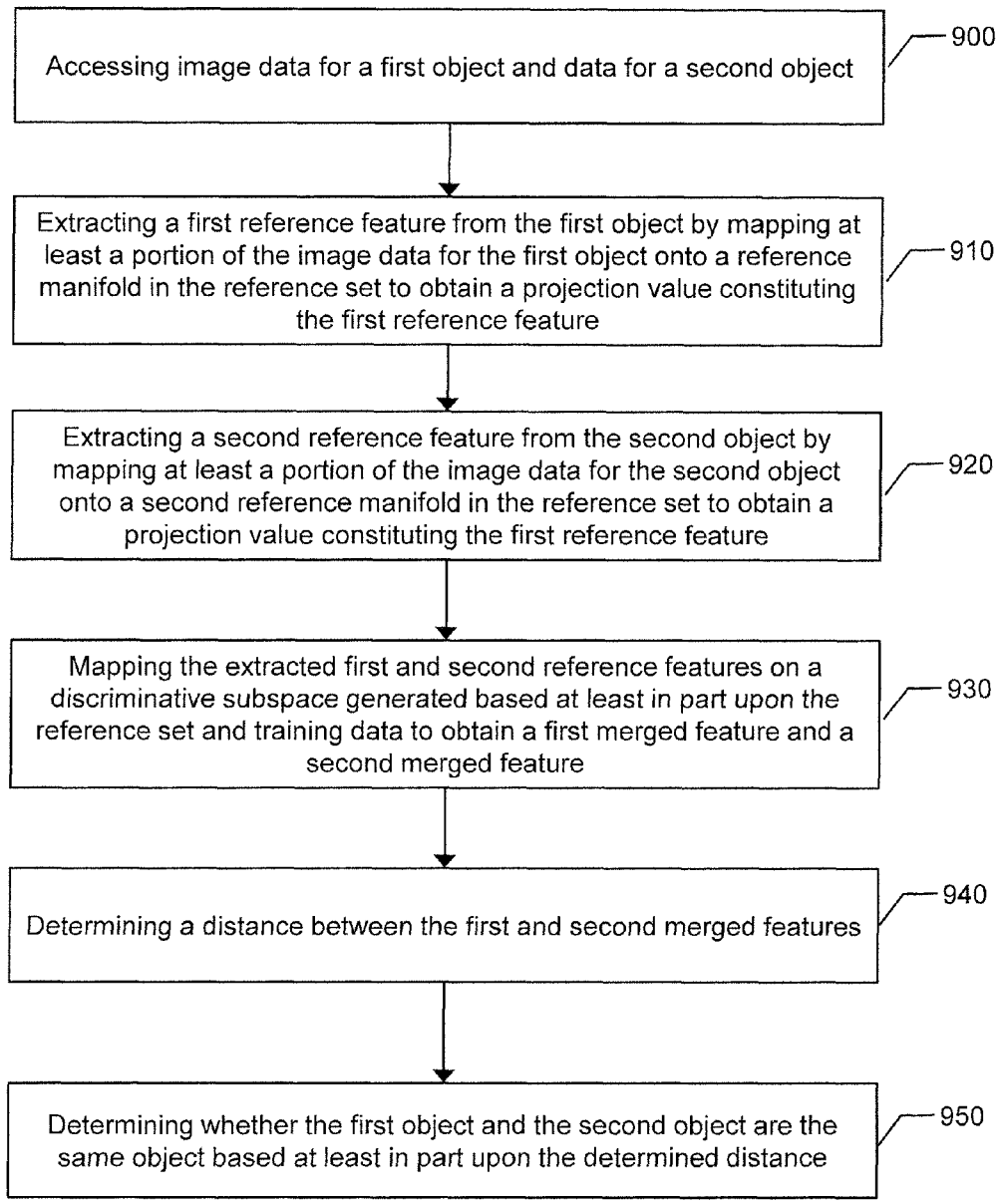
FIG. 9 illustrates a flowchart according to another example method for facilitating object recognition according to an example embodiment of the invention.

FIG. 9 illustrates a flowchart according to another example method for facilitating object recognition according to an example embodiment of the invention. The operations illustrated in and described with respect to FIG. 9 may, for example, be performed by and/or under the control of the object recognition circuitry 118. Operation 900 may comprise accessing data for a first object and data for a second object. The data for a respective object may, for example, comprise data representative of the object or a portion thereof. In this regard, the data for a respective object may, for example, comprise image data representative of an image of the object or a portion thereof. The first and second objects may, for example, comprise face objects. Operation 910 may comprise extracting a first reference feature from the first object by mapping at least a portion of the image data for the first object onto a reference manifold in the reference set to obtain a projection value constituting the first reference feature. Operation 920 may comprise extracting a second reference feature from the second object by mapping at least a portion of the image data for the second object onto a reference manifold in the reference set to obtain a projection value constituting the second reference feature. Operation 930 may comprise mapping the extracted first and second reference features on a discriminative subspace generated based at least in part upon the reference set and training data to obtain a first merged feature and a second merged feature. Operation 940 may comprise determining a distance between the first and second merged features. Operation 950 may comprise determining whether the first object and the second object are the same object based at least in part upon the determined distance. When the first and second objects comprise face objects, operation 950 may comprise determining whether the first and second objects are sampled from the same person.

FIGS. 8-9 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices (e.g., the memory 112) of a mobile terminal, server, or other computing device and executed by a processor (e.g., the processor 110) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus (e.g., the object recognition apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., an object recognition apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and computing device users. Embodiments of the invention provide for object recognition using a reference set. An example embodiment of the invention provides for enhanced object recognition by using the reference set both for training and for recognizing objects, which is also referred to as "testing." In this regard, discriminative information used for testing is derived in accordance with an example embodiment of the invention from both training data, and the reference set. Accordingly, embodiments of the invention use a reference set as an independent data collection so as to reduce the reliance of object recognition on training data. In an example embodiment, object recognition (e.g., testing) is performed using both training results and the reference set. Accordingly, embodiments of the invention utilize the reference set as a reference for all data (e.g., training data and testing data) in a given space. In this regard, the reference set provides a third data set in addition to a training set and testing set in an example embodiment of the invention. Embodiments of the invention further provide for coding data with reference features derived using the reference set and balancing the importance of reference sets through supervised learning. Accordingly, embodiments of the invention may provide for enhanced object recognition. Some embodiments are particularly applicable to face recognition.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    accessing data for a first object and data for a second object;
    extracting a reference feature ($P_{ji}^a$) from each of the first object and the second object, wherein the reference feature ($P_{ji}^a$) is represented as:

$$P_{ji}^a = S_a^T(Tr_{ji} - m_a)$$

where $Tr_{ji}$ is training data comprising a discriminative subspace and $Tr_{ji} = \{Tr_{j1}, Tr_{j2}, \ldots, Tr_{ji}, \ldots | j \leq G\}$ among G face classes,
    where $m_a$ is a reference mean, and $S_a$ is a reference manifold and $S_a^T$ is a transformation matrix of $S_a$;
    comparing, by a processor, the first and second objects based at least in part upon the reference features from each of the first and second object, wherein the comparing comprises:
        mapping the extracted first and second reference features on the discriminative subspace to obtain a first merged feature and a second merged feature;
        determining a distance between the first and second merged features; and
        determining whether the first object and the second object are the same object comprises determining whether the first object and the second object are the same object based at least in part upon the determined distance; and
    determining, using a processor, whether the first object and the second object are the same object based at least in part upon the comparison.

2. The method of claim 1, wherein determining whether the first object and the second object are the same object comprises determining that the first object and the second object are the same object when the determined distance is less than a predetermined threshold distance.

3. The method of claim 1, further comprising generating the reference set from a set of reference objects.

4. The method of claim 1, further comprising:
    determining a discriminative subspace from the extracted reference features using a supervised learning technique, wherein the training results comprise the determined discriminative subspace.

5. The method of claim 1, wherein the first object comprises a first face and the second object comprises a second face, and wherein determining whether the first object and the second object are the same object comprises determining whether the first face and the second face are sampled from the same person.

6. An apparatus comprising at least one processor and at least one memory storing computer program code, wherein the at least one memory and stored computer program code are configured to, with the at least one processor, cause the apparatus to at least:
    access data for a first object and data for a second object;
    extract a reference feature ($P_{ji}^a$) from each of the first object and the second object, wherein the reference feature ($P_{ji}^a$) is represented as:

$$P_{ji}^a = S_a^T(Tr_{ji} - m_a)$$

where $Tr_{ji}$ is training data comprising a discriminative subspace and $Tr_{ji} = \{Tr_{j1}, Tr_{j2}, \ldots, Tr_{ji}, \ldots | j \leq G\}$ among G face classes,
    where $m_a$ is a reference mean, and $S_a$ is a reference manifold and $S_a^T$ is a transformation matrix of $S_a$;
    compare the first and second objects based at least in part upon the reference features from each of the first and second object, wherein causing the apparatus to compare the first and second objects comprises causing the apparatus to:
        map the extracted first and second reference features on the discriminative subspace to obtain a first merged feature and a second merged feature; and
        determine a distance between the first and second merged features; and
    the at least one memory and stored computer program code are configured to, with the at least one processor, cause the apparatus to determine whether the first object and the second object are the same object by determining whether the first object and the second object are the same object based at least in part upon the determined distance; and
    determine whether the first object and the second object are the same object based at least in part upon the comparison.

7. The apparatus of claim 6, wherein the at least one memory and stored computer program code are configured to, with the at least one processor, cause the apparatus to determine whether the first object and the second object are the same object by determining that the first object and the second object are the same object when the determined distance is less than a predetermined threshold distance.

8. The apparatus of claim 6, wherein the at least one memory and stored computer program code are configured to, with the at least one processor, cause the apparatus to generate the reference set from a set of reference objects.

9. The apparatus of claim 6, wherein the at least one memory and stored computer program code are configured to, with the at least one processor, further cause the apparatus to:
determine a discriminative subspace from the extracted reference features using a supervised learning technique, wherein the training results comprise the determined discriminative subspace.

10. The apparatus of claim 9, wherein the supervised learning technique comprises linear discriminant analysis.

11. The apparatus of claim 6, wherein the first object comprises a first face and the second object comprises a second face, and wherein the at least one memory and stored computer program code are configured to, with the at least one processor, cause the apparatus to determine whether the first object and the second object are the same object by determining whether the first face and the second face are sampled from the same person.

12. A computer program product comprising at least one non-transitory computer-readable storage medium having computer-readable program instructions stored therein, the computer-readable program instructions comprising program instructions configured to:
access data for a first object and data for a second object;
extract a reference feature ($P_{ji}^a$) from each of the first object and the second object, wherein the reference feature ($P_{ji}^a$) is represented as:

$$P_{ji}^a = S_a^T(Tr_{ji} - m_a)$$

where $Tr_{ji}$ is training data comprising a discriminative subspace and $Tr_{ji} = \{Tr_{j1}, Tr_{j2}, \ldots, Tr_{ji}, \ldots | j \leq G\}$ among G face classes,
where $m_a$ is a reference mean, and $S_a$ is a reference manifold and $S_a^T$ is a transformation matrix of $S_a$;
compare the first and second objects based at least in part upon the reference features from each of the first and second object, wherein the program code instructions configured to compare the first and second objects comprises program code instructions to:
map the extracted first and second reference features on the discriminative subspace to obtain a first merged feature and a second merged feature;
determine a distance between the first and second merged features; and
determine whether the first object and the second object are the same object comprises determining whether the first object and the second object are the same object based at least in part upon the determined distance; and
determine whether the first object and the second object are the same object based at least in part upon the comparison.

13. The method of claim 1, wherein the object reference mean is calculated by the formula $$m_i = \sum_{g=1}^{t_i} \frac{R_i^g}{t_i} \tag{1}$$

where $R_i$ is a reference object, $R_i = \{R_i^1, R_i^2, \ldots, R_i^{t_i}\}$, $i \leq W$, where W is the number of reference objects and $t_i$ is an image number in $R_i$.

14. The method of claim 13, where the data in $R_i$ is centralized at the mean to obtain normalized set $\overline{R_i} = \{\overline{R_i^1}, \overline{R_i^2}, \ldots \overline{R_i^{t_i}}\}$, where $\overline{R_i^g} = R_i^g - m_i$.

15. The method of claim 14, wherein the manifold $S_a$ is calculated by a single value decomposition on the covariance of the matrix of $R_i$.

16. The apparatus of claim 6, wherein the object reference mean is calculated by the formula $$m_i = \sum_{g=1}^{t_i} \frac{R_i^g}{t_i} \tag{1}$$

where $R_i$ is a reference object, $R_i = \{R_i^1, R_i^2, \ldots R_i^{t_i}\}$, $i \leq W$, where W is the number of reference objects and $t_i$ is an image number in $R_i$.

17. The apparatus of claim 16, where the data in $R_i$ is centralized at the mean to obtain normalized set $\overline{R_i} = \{\overline{R_i^1}, \overline{R_i^2}, \ldots \overline{R_i^{t_i}}\}$, where $\overline{R_i^g} = R_i^g - m_i$.

18. The apparatus of claim 17, wherein the manifold $S_a$ is calculated by a single value decomposition on the covariance of the matrix of $R_i$.

* * * * *